(12) United States Patent
Kaitsuka (10) Patent No.: US 8,061,385 B2
(45) Date of Patent: Nov. 22, 2011

(54) COMBINED SAFETY VALVE

(75) Inventor: Masanori Kaitsuka, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 1075 days.

(21) Appl. No.: 11/860,033

(22) Filed: Sep. 24, 2007

(65) Prior Publication Data

US 2008/0087331 A1 Apr. 17, 2008

(30) Foreign Application Priority Data

Oct. 11, 2006 (JP) ................................. 2006-277947

(51) Int. Cl.
*F16L 37/367* (2006.01)
(52) U.S. Cl. .................. 137/614.01; 137/614; 285/364; 285/406
(58) Field of Classification Search .................. 137/614, 137/614.01, 627.5, 885, 271; 285/364, 367, 285/406, 409; 184/55.1, 55.2
See application file for complete search history.

(56) References Cited

U.S. PATENT DOCUMENTS

| | | | | |
|---|---|---|---|---|
| 4,070,045 A | * | 1/1978 | Colter et al. | 285/325 |
| 4,082,324 A | * | 4/1978 | Obrecht | 285/364 |
| 4,090,532 A | * | 5/1978 | Story, Jr. | 137/624.15 |
| 4,289,335 A | * | 9/1981 | Olbermann | 285/364 |
| 4,352,511 A | * | 10/1982 | Ribble et al. | 285/364 |
| 4,527,818 A | * | 7/1985 | Rundell | 285/367 |
| 4,533,020 A | * | 8/1985 | Yamazaki | 184/55.2 |
| 5,372,392 A | | 12/1994 | Dunn et al. | |
| 5,383,689 A | * | 1/1995 | Wolfe, Sr. | 285/364 |
| 6,039,358 A | * | 3/2000 | Stoll et al. | 285/364 |
| 6,913,115 B2 | * | 7/2005 | Tomita et al. | 184/55.2 |
| 2003/0006097 A1 | | 1/2003 | Tomita et al. | |
| 2004/0168729 A1 | * | 9/2004 | Hodges | 137/596.16 |

FOREIGN PATENT DOCUMENTS

| | | |
|---|---|---|
| DE | 1426511 A | 8/1963 |
| DE | 102 28 977 A1 | 6/2002 |
| JP | 58-142084 A | 2/1982 |
| JP | 57-143402 | 9/1982 |
| JP | 61-228106 | 10/1986 |
| JP | 7-32269 | 6/1995 |
| JP | 2003-21118 | 1/2003 |
| JP | 2006-2850 | 1/2006 |

OTHER PUBLICATIONS

Office Action issued Jul. 6, 2010, in DE 10 2007 047 699 A1, filed Oct. 5, 2007, with partial English translation.
Office Action issued Aug. 22, 2011, in Japanese Patent Application No. 2006-277947 (with English-language Translation).

* cited by examiner

*Primary Examiner* — John Rivell
*Assistant Examiner* — Craig J Price
(74) *Attorney, Agent, or Firm* — Oblon, Spivak, McClelland, Maier & Neustadt, L.L.P.

(57) ABSTRACT

A coupling frame formed at a connecting portion on an out-port side of a first safety valve, and a coupling frame formed at a connecting portion on an in-port side of a second safety valve are brought into contact with each other, directly or by causing a plate-shaped member to intervene in between. Coupling projections, facing each other, formed in the coupling frame of both the safety valves are sandwiched between a pair of latch portions of a latch member, and a pair of latch members facing each other, are mutually drawn by tightening rod members. The coupling projections of both the safety valves are thereby pressed in a mutually approaching direction with the latch portions of each of both the latch members, and thereby both the safety valves are coupled.

5 Claims, 12 Drawing Sheets

COMBINED SAFETY VALVE

TECHNICAL FIELD

The present invention relates to a combined safety valve where two safety valves, which are provided in an air pressure supply flow path to an air pressure actuator, are serially connected in a connected row arrangement to improve safety of a machine operated by the air pressure actuator.

BACKGROUND ART

In order to improve safety of a machine, operated by an air pressure actuator, a combined safety valve of high safety is put into practical use, in which safety valves formed of a pilot-type single action three-port valve are doubly installed, and in which the supply of air to an actuator is assuredly enabled to block off even when the safety valve on the other side is normal, in a case that a failure occurs on one safety valve side.

In a patent document 1 (Japanese Unexamined Utility Model Registration Application Publication No. 7-32269) described as an example, a dual safety valve for use in press, in which two sets of main valves (two-position three-port valve) are embedded in parallel in a valve body, and in which a housing where two sets of pilot valves of an electromagnetic-type are embedded is disposed on an upside of the valve body, and in which a position detecting device of the main valve is disposed on a downside of the valve body, is disclosed. The position detecting device of the main valve is configured such that a detecting pin fixed on the two sets of main valve is projected to the downside of the valve body, a magnet moves in an interlocking manner with a movement of the detecting pin, and the movement of the magnet is detected by means of a magnetic sensitivity-type switch.

In the dual safety valve, when both the pilot valves are inoperative, both the main valves are located at an upper position and an operating port is allowed to communicate with a discharge port, and each of the detecting pins of both the main valves is located at an upper position, and thereby both switches are turned off. When both the pilot valves are operated, both the main valves move to a lower position, an intake port and an operation port are allowed to communicate with each other and air is supplied to a press, and each of the detecting pins of both the main valves moves to a lower position, and thereby both the switches are turned on. During the time when both the pilot valves are operated, and when the main valve of one side does not move to the lower position due to a failure thereof, the switch of one main valve is turned off and the switch of the other main valve is turned on. A control circuit detects an erroneous operation and returns the other main valve to the non-operating position so that the air is not supplied to the press.

However, in the dual safety valve in the patent document 1, since two sets of the pilot valves, the main valves, and the position detecting devices of respective main valves are respectively disposed in the single housing, the single valve body, and a single lower chassis, there is a problem that the dual safety valves have to be entirely exchanged even when the failure occurs only on one side of the pilot valves, the main valves, and the position detecting devices.

DISCLOSURE OF INVENTION

A technical problem of the present invention is to eliminate a waste such as that a safety valve on the side having no failure is scrapped when one side of the safety valves is in failure in a combined safety valve having the safety valves formed of two sets of pilot-type three-port valve, by enabling only a safety valve on the failed side of the combined safety valve to be exchanged.

Further, other technical problem of the present invention is to achieve a combined safety valve in consideration of that tightening force of a coupling member does not affect an adverse effect for functions of the safety valve via a valve body of the safety valve in detachably connecting two sets of the safety valves.

In order to solve the problems, the present invention is characterized in that in a combined safety valve, where a first safety valve and a second safety valve respectively formed of a pilot-type three-port valve are separatably coupled by means of a connecting implement in a condition of communicating an out-port of the first safety valve and an in-port of the second safety valve, a connecting surface where an out-port is opened is formed at a connecting portion on the out-port side of the first safety valve, and a coupling projection is formed on a position of both side end portions of the connecting surface, and a connecting surface where an in-port is opened is formed at a connecting portion on the in-port side of the second safety valve, and a coupling projection is formed at a position corresponding to the coupling projection of the first safety valve, at both side end portions of the connecting surface, and the connecting implement includes a plate-shaped member intervening between both of the out-port and the in-port, and a coupling member for coupling both of the connecting portions, and the plate-shaped member includes a continuous hole for communicating the out-port and the in-port, and a contacting surface where the connecting surface on the out-port side and the connecting surface on the in-port side are brought into contact with each other, and the coupling member fixes the coupling projections, facing each other, of the connecting portion of both of the safety valve, by tightening in a mutually approaching direction.

In other embodiment of the present invention, instead of providing the plate-shaped member between the connecting surface on the out-port side and the connecting surface on the in-port side, each of the connecting surfaces may be directly brought into contact therewith.

In a preferred embodiment of the combined safety valve according to the present invention, the connecting portion on the out-port of the first safety valve and the connecting portion on the in-port side of the second safety valve are constructed by fixing a coupling frame in a separate body to a valve body, or a coupling frame integrally formed with the valve body is provided and the connecting surface and the coupling projection are provided in the coupling frame.

In other preferred embodiment of the present invention, a back surface of the coupling projection facing an opposite side of the connecting surface is formed of a tapered surface slanting in a direction gradually approaching the connecting surface toward a tip end side of the coupling projection, and the coupling member includes two latch members positioned at both sides of the connecting portion, and a rod member for tightening the latch members in a direction for drawing the latch members each other, and the latch members are provided with a pair of latch portions for sandwiching the coupling projections from both sides by slanting in a direction along the tapered surface of the coupling projections facing each other.

In a case that the connecting implement is provided with the plate-shaped member, the plate-shaped member is provided with an upper frame portion and a lower frame portion, and the rod member is passed through a penetration hole and a passing through groove formed in the upper frame portion and the lower frame portion, and one end and the other end of the rod member are latched with both the latch members, or the rod member is formed of a bolt and both the latch members are fixed to the plate-shaped member with the bolt.

Furthermore, the combined safety valve can be configured such that a pilot valve for driving a main valve of each of the first safety valve and the second safety valve, and a position detecting device for detecting a position of the main valve are disposed on each of the valve bodies of the first safety valve and second safety valve.

In the above-described combined safety valve according to the present invention, since the connecting surface on the out-port side of the first safety valve and the connecting surface on the in-port side of the second safety valve are directly or indirectly brought into contact with each other and both contacting surfaces are separatably coupled, it becomes possible to exchange only a safety valve on the failed side, and to eliminate a waste such as that a safety valve on the side having no failure is scrapped.

Moreover, in detachably connecting two sets of the safety valves, since both the connecting portions of the first safety valve and second safety valve are constructed by fixing a coupling frame in a separate body to a valve body of both the safety valves, or by providing a coupling frame integrally formed with the valve body of the safety valve in both the connecting portions, and a coupling projections are provided in the coupling frame, and the coupling projections are tightened with each other, tightening force of a coupling member can be suppressed to affect an adverse effect for functions of the safety valve via the valve body of the safety valve.

BEST MODE FOR CARRYING OUT THE INVENTION

FIG. 1 through 3 and FIG. 4A through FIG. 4C illustrate a first embodiment of a combined safety valve according to the present invention. This combined safety valve is provided with a first safety valve 10A and a second safety valve 10B respectively formed of a pilot-type single action three port valve. These safety valves 10A and 10B are connected in a condition where an out-port 20 of the first safety valve 10A and an in-port 19 of the second safety valve 10B are allowed to communicate with each other. Further, the in-port 19 of the first safety valve is allowed to communicate with an air pressure source, and the out-port 20 of the second safety valve is allowed to communicate with an actuator to be driven, and respective air-discharge ports 21 thereof are opened to ambient air. Incidentally, since the constructions of the first safety valve 10A and the second safety valve 10B are substantially the same, the first safety valve 10A is mainly explained here, and the explanation of the second safety valve 10B is omitted by attaching the same numerals to the main elements as that of the first safety valve 10A.

Figure 1:
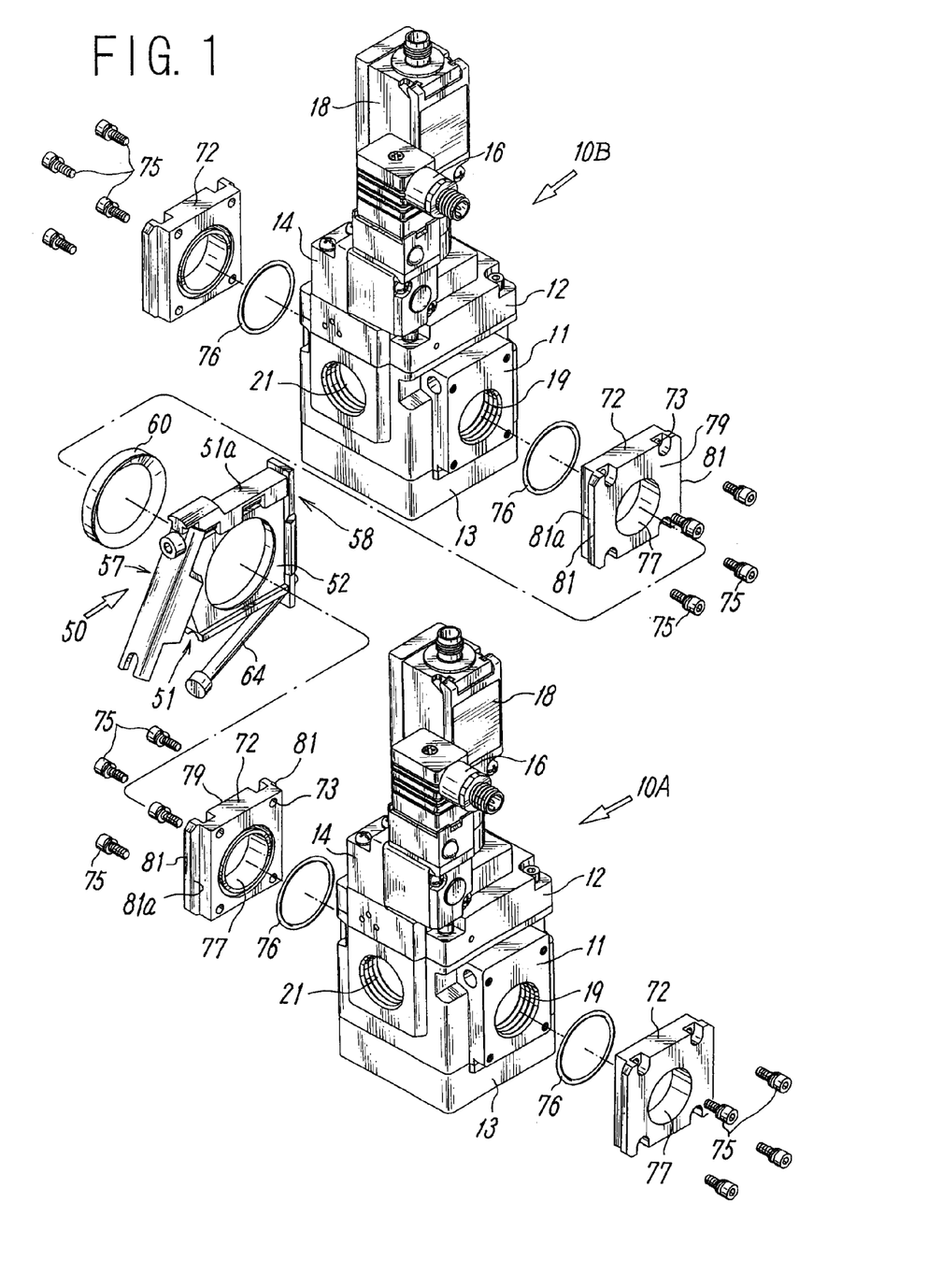
FIG. 1 is an exploded perspective view illustrating a first embodiment of a combined safety valve according to the present invention.
Figure 2:
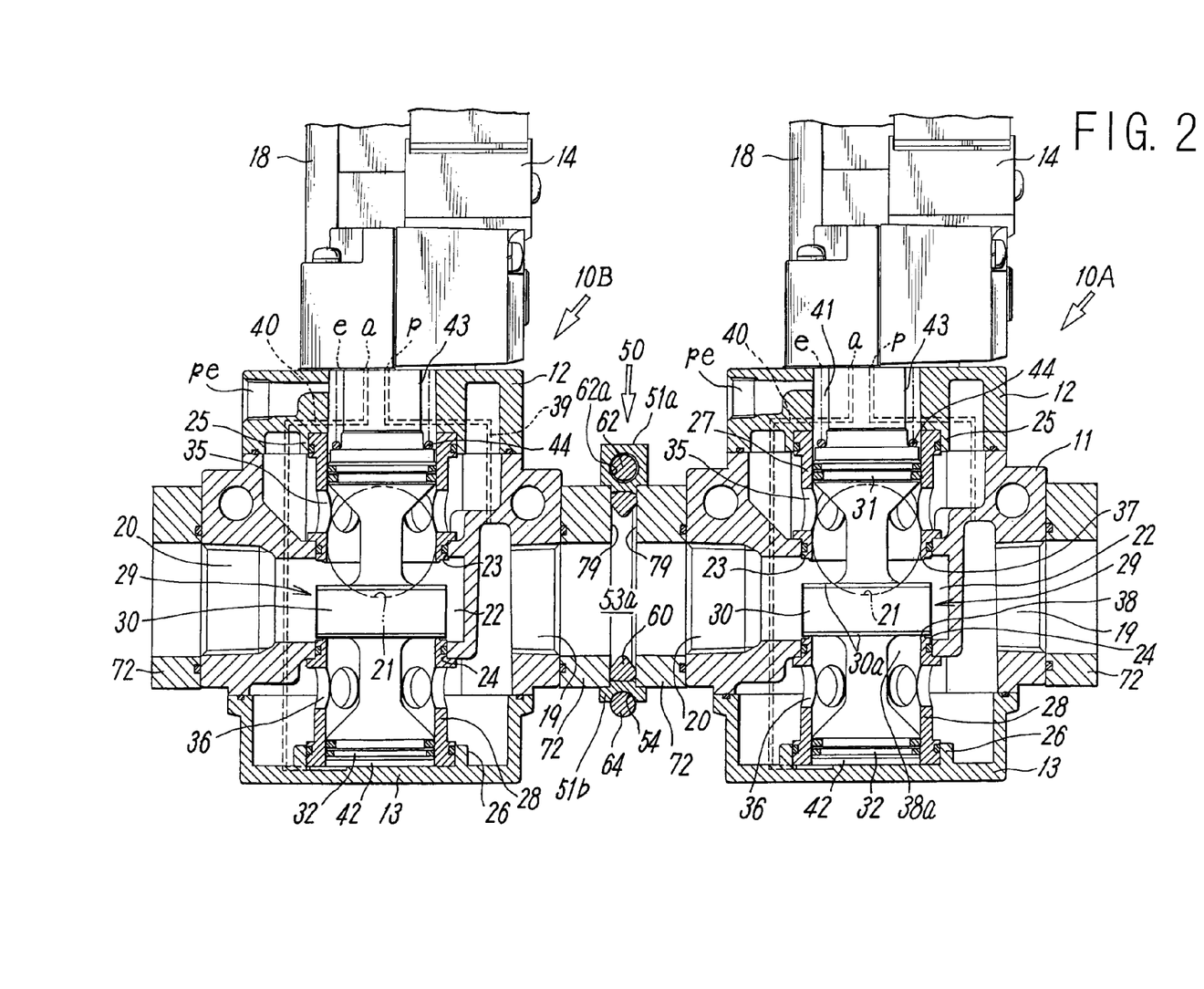
FIG. 2 is a partially enlarged longitudinal front view illustrating a main part of the first embodiment of the combined safety valve according to the present invention.
Figure 3:
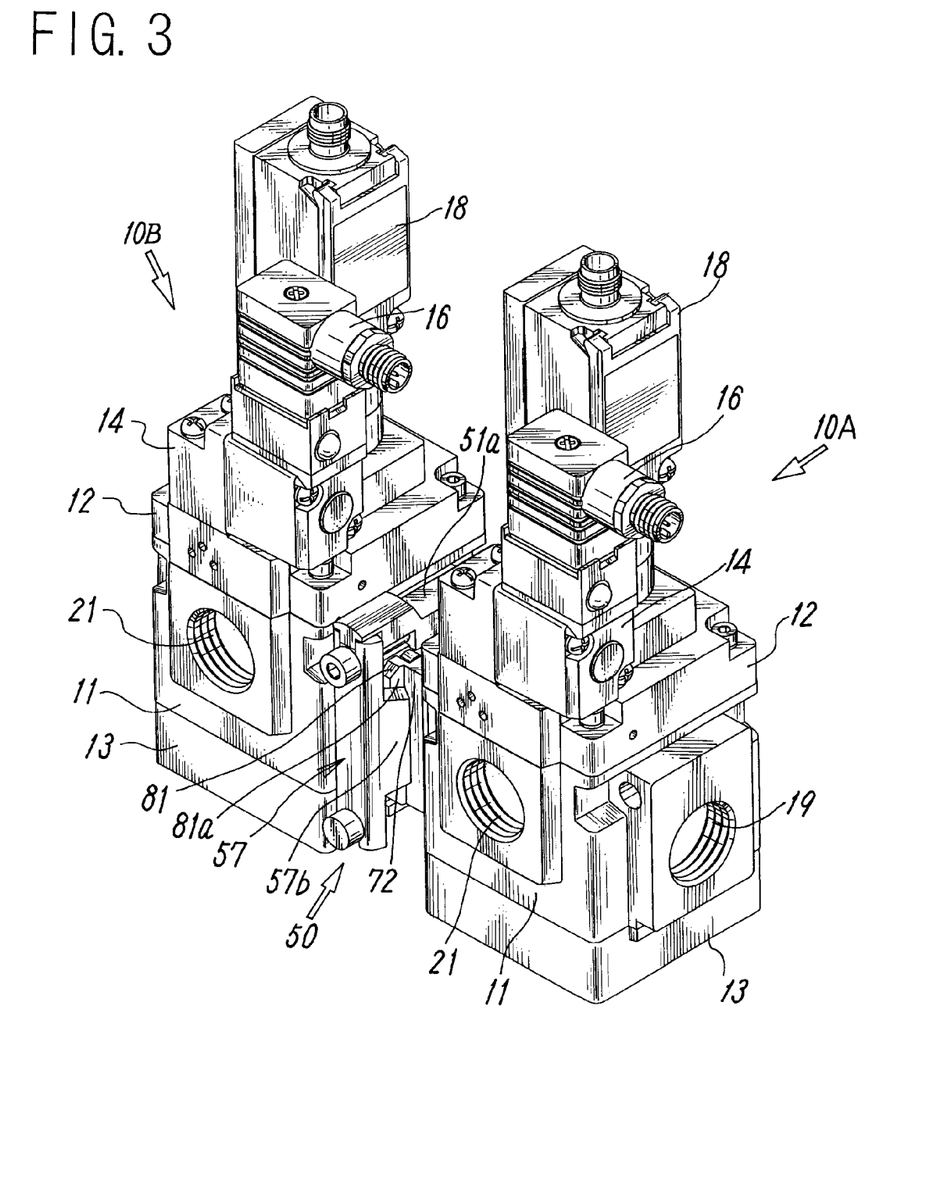
FIG. 3 is a perspective view illustrating a makeup of the first embodiment of the combined safety valve according to the present invention.
Figure 4A:
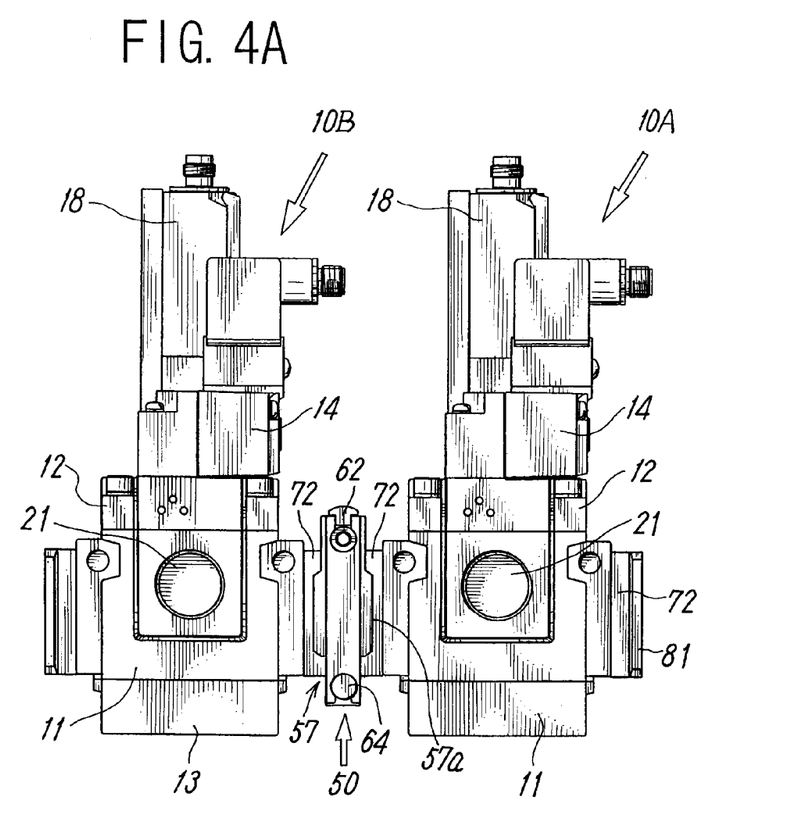
FIG. 4A is a front view illustrating the first embodiment of the combined safety valve according to the present invention.
Figure 4B:
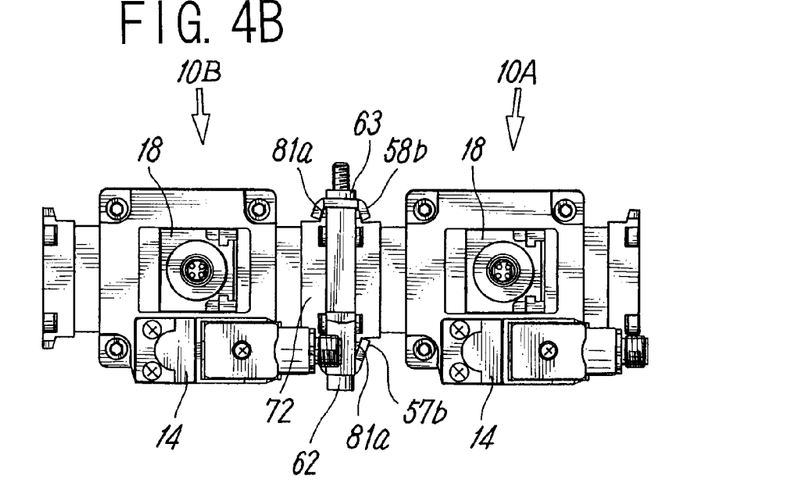
FIG. 4B is a top view illustrating the first embodiment of the combined safety valve according to the present invention.
Figure 4C:
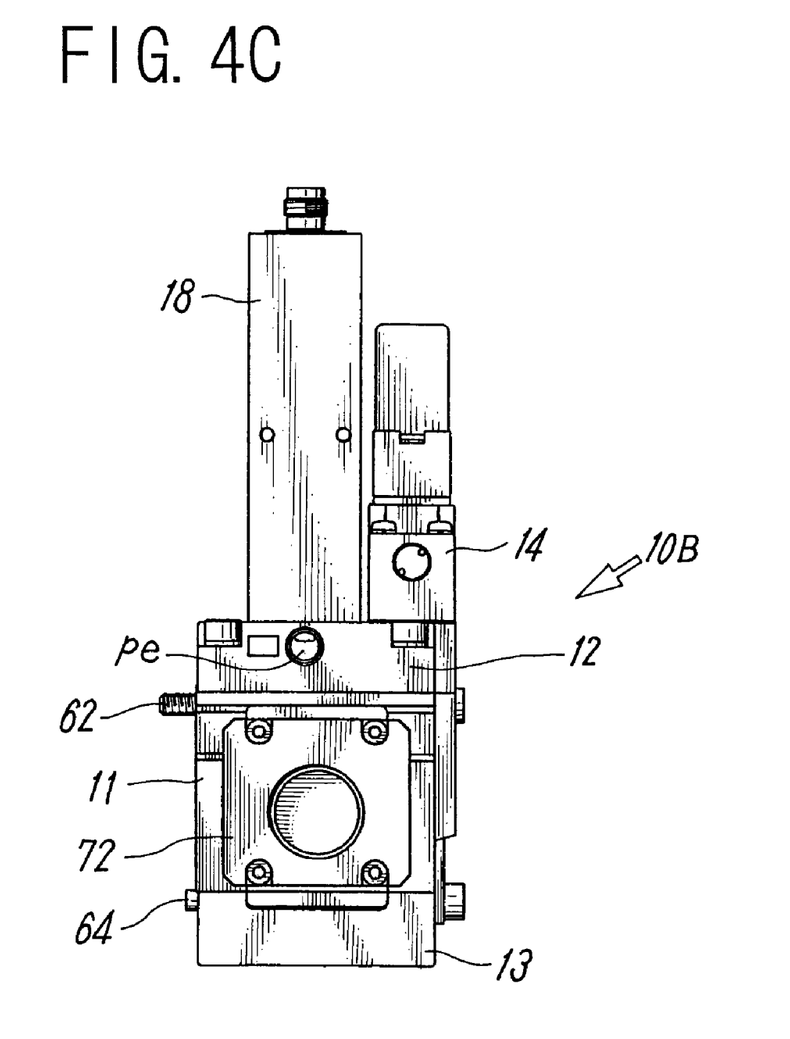
FIG. 4C is a left side view of the first embodiment of the combined safety valve according to the present invention.

Referring to FIG. 1 through FIG. 3, a construction of the first safety valve 10A will be explained. In the first safety valve 10A, a cover 12 is fixed on an upper surface of a valve body 11 thereof in an air-tight manner via an O-ring, and an end plate 13 is fixed on a lower surface of the valve body 11 in the air-tight manner via an O-ring. On an upper part of the cover 12, a pilot valve 14 provided with a DIN-type connector 16 and a limit switch constituting a position detecting device 18 are disposed.

The in-port 19 is opened at one side surface of the valve body 11, the out-port 20 is opened at a side surface of the opposite side, and an air-discharge port 21 is opened at another side surface. Furthermore, a valve chamber 22 is formed in the center of the valve body 11, and the valve chamber 22 is allowed to communicate with the out-port 20 by a passage way. Moreover, passing-through holes 23 and 24 are respectively formed at an upper wall and a lower wall of the valve chamber 22, and other part of the valve chamber 22 is kept airtight with a chamber wall.

Further, a cylindrically shaped retainer 27 is located between an annular projection 25 provided on a lower surface of the cover 12 and the passing through hole 23, and inserted and fixed thereto via O-rings, respectively, and similarly a cylindrically shaped retainer 28 is located between an annular projection 26 provided on an upper surface of an end plate 13 and the passing through hole 24, and inserted and fixed thereto via O-rings, respectively.

Both the retainers 27 and 28 are disposed such that center axis lines thereof are positioned on the same axis line, and through holes 35 and 36 that allow an inside of both the retainers 27 and 28 to communicate with an outside thereof are formed at respective positions near the valve chamber 22. The through hole 35 of the retainer 27 is provided for allowing an inner space of the retainer 27 to communicate with the air-discharge port 21, and the through hole 36 of the retainer 28 is provided for allowing an inner space of the retainer 28 to communicate with the in-port 19.

A main valve 29 disposed in the retainers 27 and 28 is constructed by integrally coupling pistons 31 and 32 on both surface sides of a poppet valve body 30 having a disc shape via an axis portion, and these pistons 31 and 32 are respectively fitted into the respective inner surfaces of both the retainers 27 and 28 together by insertion via an O-ring and a wear ring in a slidable manner. On an outer peripheral portion of the both surfaces of the poppet valve body 30, a seal member 30a formed of a rubber elastic material having a circular shape is mounted, and an air-discharge valve and an air-supply valve that open and close by contacting and separating valve seats 37 and 38 respectively provided on a facing end of both the retainers 27 and 28 are constructed.

The pilot valve 14 is provided with an inlet "p" allowed to communicate with the in-port 19 through a pilot airflow path 39, an outlet "a" allowed to communicate with a cylinder chamber 42 at a lower side of the piston 32 through a pilot airflow path 40, and an air-discharge outlet "e" allowed to communicate with a pilot air-discharge port "pe" through a pilot air-discharge flow path 41.

Incidentally, a solenoid that drives a pilot valve 14 of the first safety valve 10A and second safety valve 10B is connected to an electric power source that is controlled by means of a control device (not illustrated) via a connector 17, respectively.

On the other hand, in the piston 31, a rod 43 whose upper end reaches an inside of the position detecting device 18 is brought into contact with an upper end surface, a return spring 44 intervenes between a flange portion of a lower end of the rod 43 and an upper end of a rod chamber, and the rod 43 and the main valve 29 are biased downward by means of the return spring 44. Furthermore, when pilot air is supplied from the outlet "a" to the cylinder chamber 42 at a downside of the piston 32 through the pilot airflow path 40, the main valve 29 and the rod 43 rise against biasing force of the return spring 44, and the rod 43 reaches an upper end position, and when the air-supply valve (valve seat 38) is thereby fully opened, the rod 43 presses an operating element of the limit switch in the position detecting device 18 and closes a contact point of the limit switch.

Figure 5A:
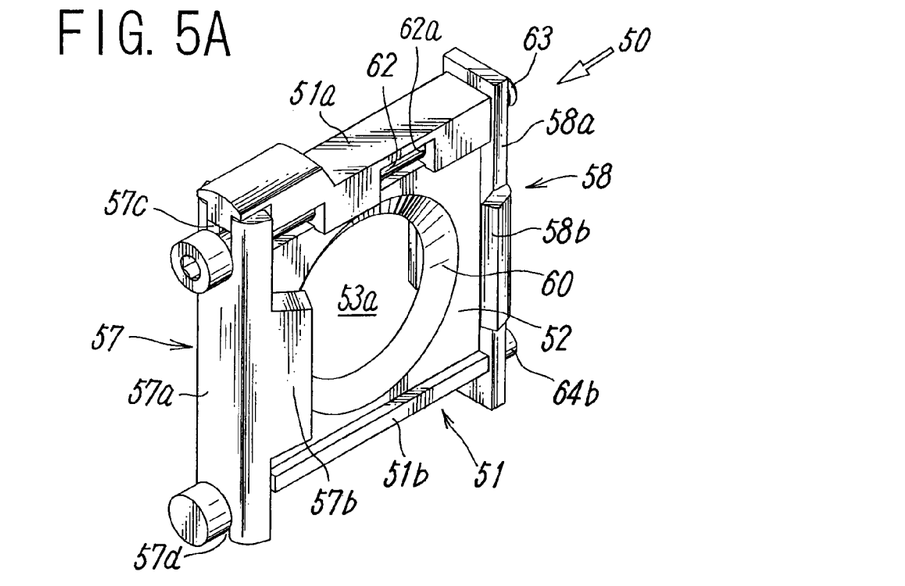
FIG. 5A is a perspective view illustrating a connecting implement for use in connecting a first safety valve and a second safety valve in the first embodiment of the combined safety valve according to the present invention.
Figure 5B:
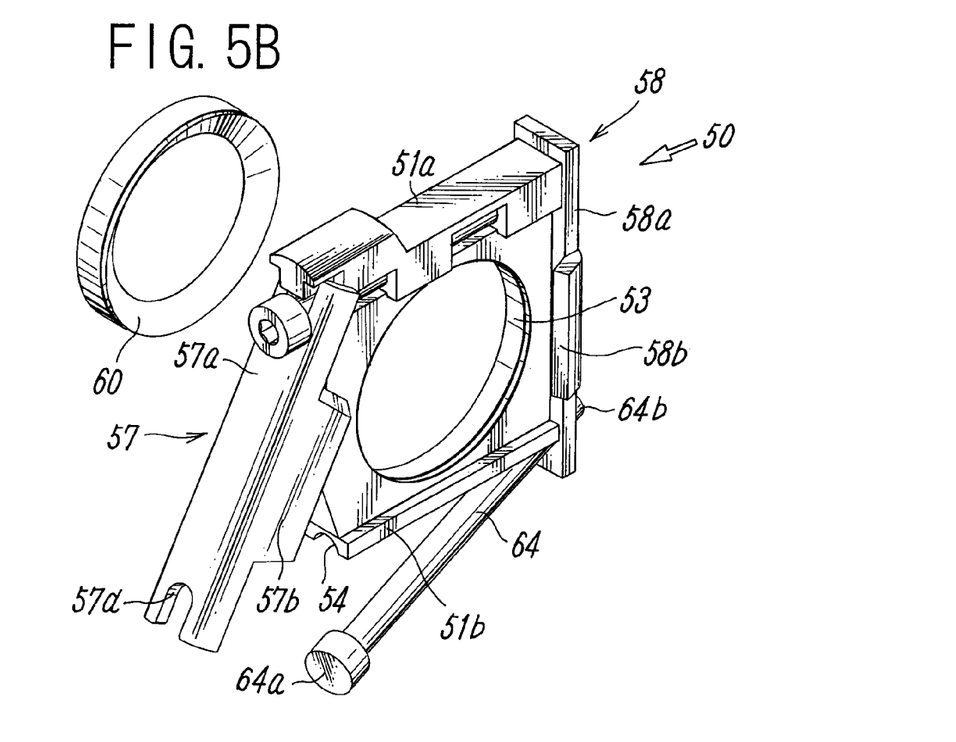
FIG. 5B is a perspective view explaining a coupling operation of the connecting implement of the combined safety valve according to the present invention.
Figure 5C:
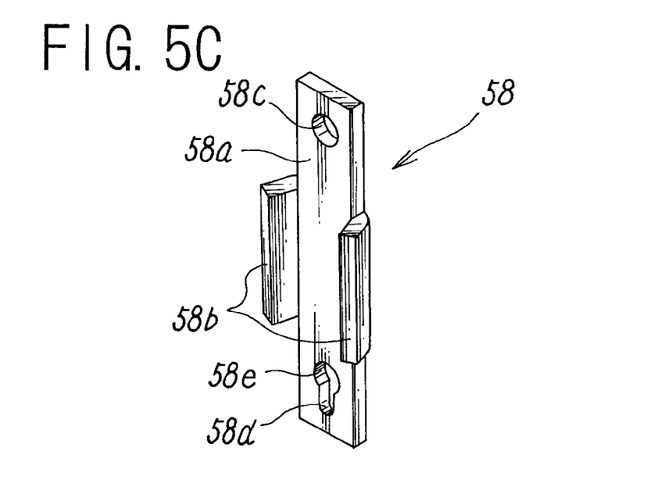
FIG. 5C is a perspective view illustrating a latch member 58 in the connecting implement of the combined safety valve according to the present invention.

The first safety valve 10A and second safety valve 10B are connected by means of a connecting implement 50 in a condition where the out-port 20 of the first safety valve 10A and the in-port 19 of the second safety valve 10B are allowed to communicate with each other. FIG. 5A through FIG. 5C illustrate an example of the connecting implement 50. The connecting implement 50 is provided with a plate-shaped member 51 intervening between a pair of the first safety valve 10A and the second safety valve 10B, and a coupling member composed of latch members 57 and 58 coupling the valve body 11 of both the first safety valve 10A and the second safety valve 10B via the plate-shaped member 51.

Both surfaces of the plate-shaped member 51 serve as a contact surface 52 where respective connecting surfaces 79 of the first safety valve 10A and the second safety valve 10B are brought into contact with. In the plate-shaped member 51, a continuous hole 53a for allowing the out-port 20 of the first safety valve 10A and the in-port 19 of the second safety valve 10B to communicate with each other is formed. Moreover, at upper and lower ends of the plate-shaped member 51, an upper frame portion 51a and a lower frame portion 51b are integrally provided in a connected row arrangement. In the upper frame portion 51a, a penetration hole 62a for passing a rod member 62 formed of a fixing bolt therethrough is formed in a longitudinal direction, and in the lower frame portion 51b, a passing through groove 54 for holding a rod member 64 formed of a coupling rod is formed at a lower position thereof in the longitudinal direction.

As is clear from FIG. 2, FIG. 5A, and FIG. 5B, an open hole 53 for forming the continuous hole 53a is provided at a center portion of the plate-shaped member 51, and an annular packing 60 having an outer diameter slightly larger than an inner diameter thereof and overhanging up to an outside of the contact surface 52 at both sides of the opening hole 53 from the opening hole 53 is attached to an inside of the opening hole 53 by insertion. An inside of the annular packing 60 serves as the continuous hole 53a.

Further, the connecting implement 50 is provided with the latch members 57 and 58 disposed at both the front and back sides of the plate-shaped member 51 to serve as the coupling member for coupling the valve body portions 11 of both the first safety valve 10A and the second safety valve 10B via the plate-shaped member 51. These latch members 57 and 58 are provided with a vertically long flat-plate-shaped portions 57a and 58a expanding along both side edges of the plate-shaped member 51, and a pair of latch portions 57b and 58b formed at both side ends of a center portion of an upper-and-lower direction of the flat-plate-shaped portions 57a and 58a. These latch portions 57b and 58b extend from the flat-plate-shaped portions 57a and 58a toward both sides of the plate-shaped member 51, and slant in a tapered manner gradually broadening toward the end. In addition, in the latch member 57 of one side, cutout grooves 57c and 57d are respectively formed at upper and lower end portions of the flat-plate-shaped portion 57a thereof, and in the latch member 58 of the other side, as illustrated in FIG. 5C, a passing-through hole 58c for passing the rod member 62 formed of the bolt therethrough is formed at an upper end portion thereof. Furthermore, at a lower end portion of the latch member 58, a fitting-in hole portion 58e where a circular head portion 64b of an end portion of the rod member 64 formed of the coupling rod is fitted in is provided in a connected row arrangement, and an engaging hole 58d to which the circular head portion 64b is configured to be engaged is provided.

The pair of latch member 57 and the latch member 58 are combined by passing the rod member 62 formed of the bolt through the cutout groove 57c of the latch member 57, the penetrating hole of the upper frame portion 51a, and the passing through hole 58c of the latch member 58, and screwing a nut 63 upon a portion projected from the latch member 58 at the upper end portion of the pair of latch members 57 and 58. Incidentally, a sheet spring (not illustrated) intervenes between the flat-plate-shaped portion 57a of the latch member 57 and the plate-shaped member 51, and the latch member 57 is biased in a direction where the latch member 57 is opened around an upper end portion thereof as a fulcrum by means of biasing force of the sheet spring as illustrated in FIG. 5B.

Moreover, lower ends of the pair of the latch member 57 and the latch member 58 are combined by passing the rod member 64 having head portions 64a and 64b at both ends thereof through the cutout groove 57d at the lower end portion of the latch member 57, the passing through groove 54 of the lower frame portion 51b, and the engaging hole 58d of the lower end portion of the latch member 58. Incidentally, the rod member 64 where the head portion 64b thereof is engaged with the engaging hole 58d of the lower end portion of the latch member 58 is configured to be swingable around an engaging portion as a center, and enables the head portion 64a of the rod member 64 to be engaged with and disengaged from the cutout groove 57d of the latch member 57 by the swinging motion as illustrated in FIG. 5B.

Figure 6:
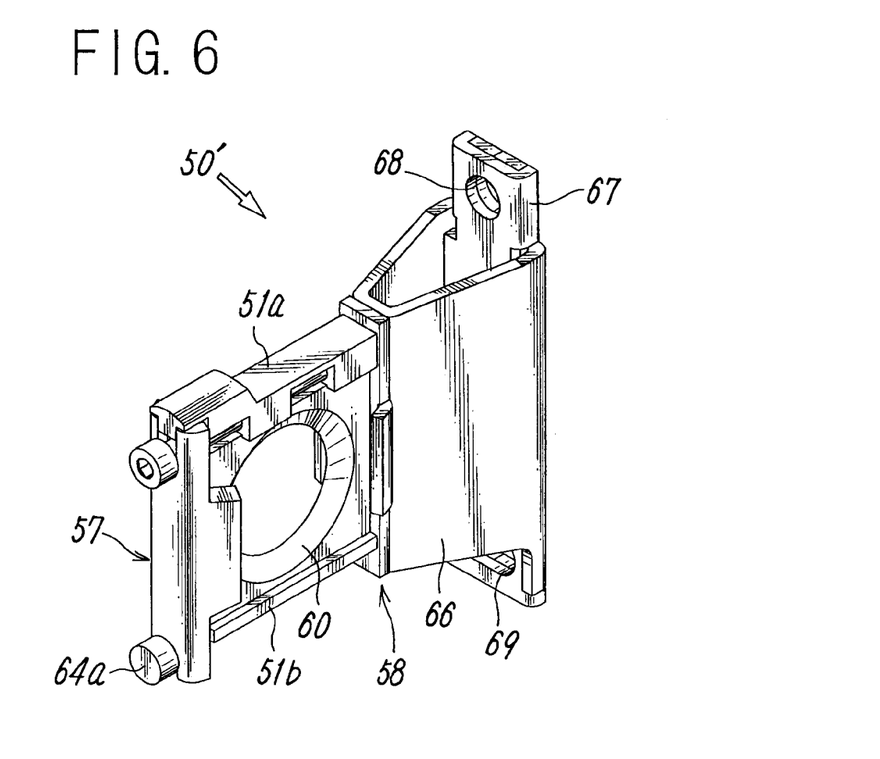
FIG. 6 is a perspective view illustrating a variation of the connecting implement illustrated in FIG. 5A and FIG. 5B.

FIG. 6 illustrates a variation of the connecting implement 50 explained referring to the FIG. 5A through FIG. 5C, and a connecting implement 50' has a construction where a bracket 67 is attached to the connecting implement 50 of the FIG. 5A through FIG. 5C, further to the above described. The bracket 67 is attached to an outside surface of the latch member 58 via a coupling piece 66, and an attaching hole 68 is formed at an upper end portion thereof and a horizontally long attaching hole 69 is formed at a lower end portion thereof. Further, the coupling piece 66 is formed of approximately trapezoid when looking from above. The coupling piece 66 may be integrally formed with the latch member 58. Incidentally, the construction other than the above described is not different from the connecting implement 50 explained with reference to FIG. 5A through FIG. 5C, and hence the same numerals are attached to the same main components as that in FIG. 5A through FIG. 5C and explanation thereof is omitted.

In each of the valve bodies 11 of the first safety valve 10A and second safety valve 10B connected by means of the connecting implement 50, as illustrated in FIG. 1, FIG. 2, and FIG. 4A through 4C, coupling frames 72 are formed on the in-port 19 side thereof and the out-port 20 side thereof.

Incidentally, in FIG. 1, FIG. 2, and FIG. 4A through 4C, the coupling frames 72 are also provided on the in-port 19 side of the first safety valve 10A and the out-port 20 side of the second safety valve 10B. Since these coupling frames 72 are not necessary for mutually connecting the first safety valve 10A and the second safety valve 10B by means of the connecting implement 50, there is no necessity to provide the same. However, the coupling frames 72 can conduce to a connection with other pipe arrangements or the like by means of a similar connecting implement 50 by providing the coupling frames 72.

The coupling frames 72 are respectively attached to the out-port 20 side and the in-port 19 side of the first safety valve 10A and the second safety valve 10B via O-rings 76, and the coupling frames 72 have the same shape with each other. The coupling frame 72 has a continuous hole 77 allowed to communicate with the out-port 20 or the in-port 19 at a center of a block forming a rectangular solid, and is provided with coupling projections 81, respectively, at positions of both side ends of the connecting surface 79 that contacts a contact surface 52 of the plate-shaped member 51, namely at positions corresponding to the two of the latch members 57 and 58. Moreover, four bolt holes 73 are opened at four corners of each coupling frames 72, and the coupling frames 72 are fixed onto a surface of the out-port 20 side or a surface of the in-port 19 side of the valve body 11 with bolts 75 which is inserting into the bolt holes 73.

A pair of the coupling projections 81 positioned on both side end portions of the connecting surface 79 is provided with a back surface 81a facing an opposite side of the connecting surface 79. The back surface 81a is formed of a tapered surface and the direction where the tapered surface is slanting is the direction for gradually approaching the connecting surface 79 toward a tip end side of the coupling projection 81. On the other hand, in the latch members 57 and 58 constituting the coupling member, as described above, the pair of latch portions 57b and 58b positioned on both sides of the flat-plate-shaped portions 57a and 58a are broadened in a tapered manner as described above. However, the direction where the latch portions 57b and 58b is slanting is the direction extending along the tapered surface of the back surface 81a of the coupling projections 81.

Accordingly, the two coupling frames 72 and 72 are coupled and fixed via a plate-shaped member 51 to each other in between the pair of latch portions 57b and 57b, and 58b and 58b, by bringing the pair of latch portions 57b and 57b, and 58b and 58b of the two latch members 57 and 58 into contact with the back surfaces 81a and 81a of the respective coupling projections 81 and 81 of two of the coupling frames 72 and 72 positioned on both sides of the plate-shaped member 51, and by tightening up the latch members 57 and 58 with the rod members 62 and 64 in a direction for drawing the latch members 57 and 58 to each other.

When the coupling frames 72 and 72 are thus connected, the tightening force of the rod members 62 and 64 for mutually tightening the latch members 57 and 58 is applied to only the coupling frames 72 and 72, and since pressure force for pressing the connecting surface 79 of the coupling frames 72 and 72 to the contact surface 52 of the plate-shaped member 51 is only applied from the latch portions 57b and 58b of the latch members 57 and 58 to both the coupling projections 81 and 81 of the coupling frames 72 and 72, there is no possibility that the tightening force of the coupling member affects an adverse effect for functions of the safety valve via each of the valve bodies 11 of the first safety valve 10A and the second safety valve 10B as a result.

When the first safety valve 10A and the second safety valve 10B are coupled with the connecting implement 50, two of the coupling frames 72 and 72 are brought into contact with both sides of the plate-shaped member 51 in a condition of the connecting implement 50 illustrated in FIG. 5B. Thereafter, the coupling projections 81 and 81, facing each other, at both side ends of the coupling frames 72 and 72 are sandwiched between the latch portions 57b and 57b, and 58b and 58b of two of the latch members 57 and 58. Then, the coupling projections 81 and 81, and the plate-shaped member 51 are strongly pressed by drawing two of the latch members 57 and 58 each other by tightening the rod members 62 and 64. In concrete terms, a nut 63 is screwed upon a coupling projection of the rod member 62 formed of a bolt, projecting from the latch member 58, and the head portion 64a of the rod member 64 is engaged with the cutout groove 57d of the latch member 57 upon engaging the head portion 64b of the rod member 64 with the engaging hole 58d at a lower end portion of the latch member 58. Thereby, the connecting surface 79 of each of the coupling frames 72 and 72 is brought into contact with the contact surface 52 of the plate-shaped member 51, and the coupling frames 72 and 72 are coupled via the plate-shaped member 51.

Currently, the annular packing 60 of the plate-shaped member 51 is compressed by the connecting surface 79 of each coupling frame 72 of the first safety valve 10A and the second safety valve 10B, and this results in sealing a periphery of the continuous hole 53a.

Incidentally, it is natural to say that the connecting surface 79 of the coupling frame 72 on the out-port side of the first safety valve 10A and the connecting surface 79 of the coupling frame 72 on the in-port side of the second safety valve 10B can be separated by returning the connecting implement 50 to a condition illustrated in FIG. 5B.

Next, an operation of the first embodiment will be explained with reference to FIG. 2.

FIG. 2 illustrates a condition in which an electric power is not distributed to the pilot valves 14A and 14B of two of the respective first safety valve 10A and second safety valve 10B, the inlet "p" of these pilot valves 14A and 14B are blocked off, and the outlet "a" and the air-discharge outlet "e" are allowed to communicate with each other. Currently, in the main valve 29 of both the first safety valve 10A and the second safety valve 10B, since the poppet valve body 30 is in contact with the valve seat 38 led to the in-port 19 by biasing force of the return spring 44, a valve seat hole 38a is occluded. Thereby, each of the in-ports 19 of both the first safety valve 10A and the second safety valve 10B is blocked off, and each of the out-ports 20 is allowed to communicate with the ambient air through each valve chamber 22 and each air-discharge port 21 of both the first safety valve 10A and the second safety valve 10B. Consequently, the rod 43 on both the pistons 31 is also located at a lower end position, and the limit switch constituting the position detecting device 18 is in a condition of being turned off.

When the pilot valve 14 of both the first safety valve 10A and the second safety valve 10B are excited, communication between the outlet "a" and the air-discharge outlet "e" of the pilot valve 14 of the first safety valve 10A is blocked off first, the inlet "p" and the outlet "a" are allowed to communicate with each other, and the pilot air is supplied from the outlet "a" of the pilot valve 14 to the cylinder chamber 42 through the pilot airflow path 40. Thereby, the poppet valve body 30 of the first safety valve 10A is driven upward against the biasing force of the return spring 44 and reaches an upper end position, and the out-port 20 and the air-discharge port 21 of the first safety valve 10A are blocked off. In addition, each of the in-ports 19 and the valve chamber 22 are allowed to communicate with each other, and the air from the in-port 19 of the first safety valve 10A reaches the in-port 19 of the second safety valve 10B through the out-port 20 of the first safety valve 10A.

Simultaneously, the limit switch constituting the position detecting device 18 is brought to a condition of being turned on by means of the rod 43 that has reached the upper end position, and the turned-on signal is transmitted to the control device.

Currently, when the pilot valve 14 of the second safety valve 10B is excited as described above, the communication between the outlet "a" and the air-discharge outlet "e" of the pilot valve 14 of the second safety valve 10B is blocked off, and the inlet "p" and the outlet "a" are allowed to communicate with each other. Therefore, similar to the first safety valve 10A described above, the valve body 29 is operated and the air in the in-port 19 of the second safety valve 10B is supplied to an actuator (not illustrated) through the out-port 20 of the second safety valve 10B, and communication between the out-port 20B and the air-discharge port 21 is blocked off. Furthermore, the limit switch constituting the position detecting device 18 of the second safety valve 10B is operated after a slight delay from the operation of the position detecting device 18 of the first safety valve 10A, and the turned-on signal is transmitted to the control device. If the delay is shorter than a set time, the control device judges that the combined safety valve is normally operated.

At the time of exciting both the pilot valves 14A and 14B, for example, when the poppet valve body 30 does not reach the upper end position even though the same is opened, because of a failure of the first safety valve 10A, an output signal of the position detecting device 18 of the first safety valve 10A is brought to be "OFF", and an output signal of the position detecting device 18 of the second safety valve 10B is brought to be "ON". If such a condition continues for the set time, the control device detects the failure, and returns the main valve 29 of the second safety valve 10B to a non-operating position so that the air is not supplied to the actuator, and the like. Thus, various kinds of control for safely operating the actuator can be performed by the control device.

When a failure of the first safety valve 10A or the second safety valve 10B is confirmed by the control device, it is sufficient to remove only the first safety valve 10A or the second safety valve 10B in failure, and to exchange the same with a new safety valve. Removing operation for the safety valve in failure can easily be performed because both the first safety valve 10A and the second safety valve 10B can be separated by means of the connecting implement 50.

Figure 7:
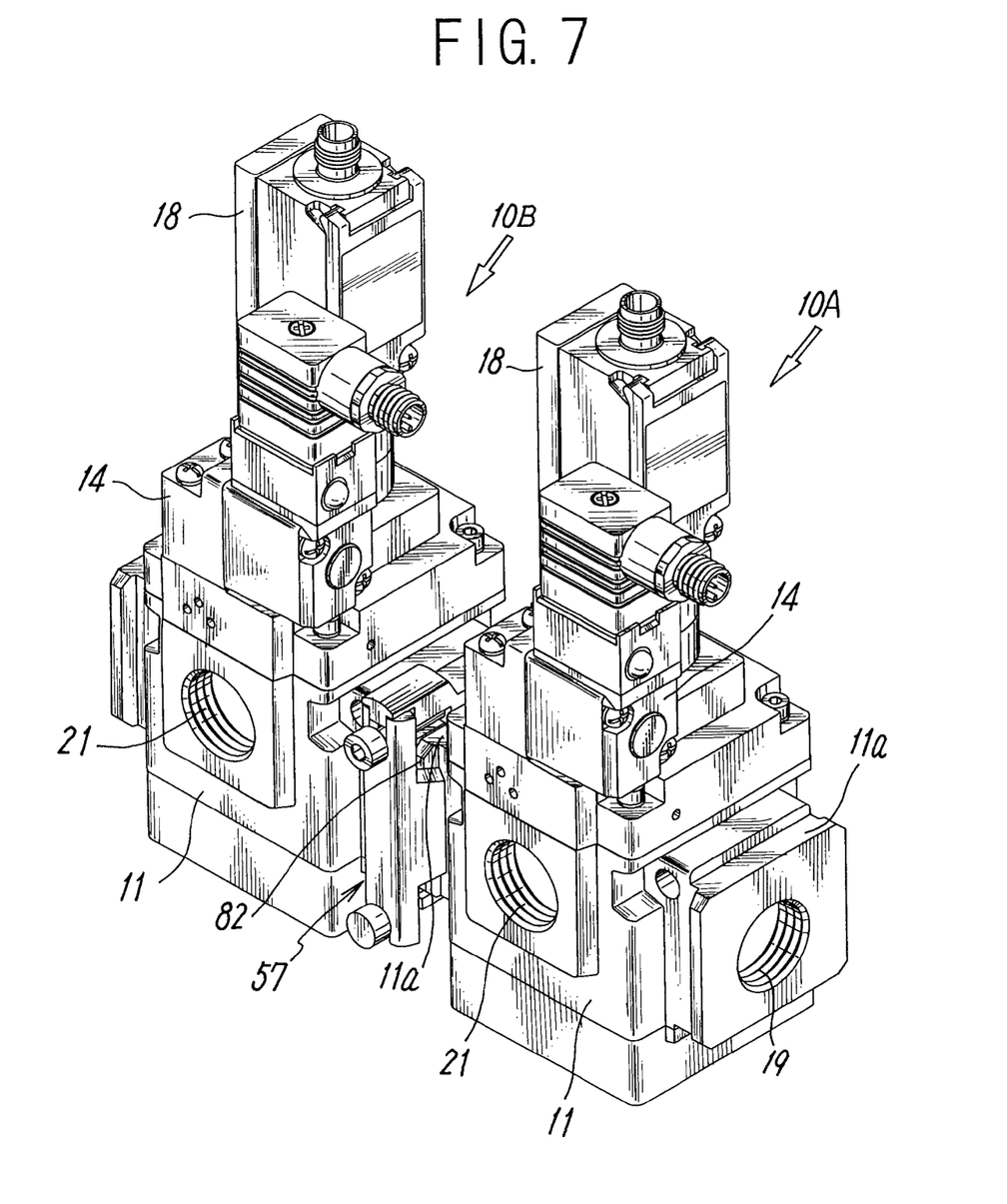
FIG. 7 is a perspective view illustrating a makeup of a second embodiment of the combined safety valve according to the present invention.
Figure 8:
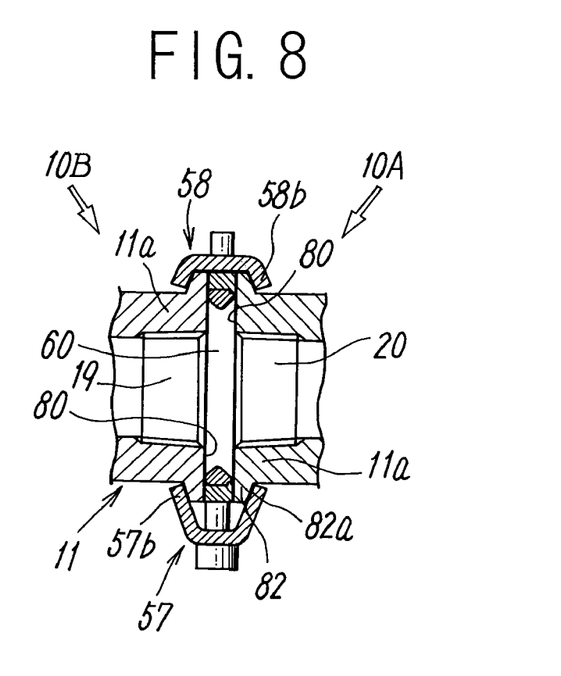
FIG. 8 is a cross-sectional view illustrating a main part of the second embodiment of the combined safety valve according to the present invention.

FIG. 7 and FIG. 8 illustrate a second embodiment of the present invention, and in the second embodiment, a coupling frame 11a is integrally formed with the valve body 11, whereas the coupling frame 72 is separately formed from the valve body 11 in the first embodiment, and the coupling frame 72 is fixed to a front surface of the out-port 20 side and a front surface of the in-port 19 side with a bolt 75. Namely, as illustrated in FIG. 8, each of the coupling frames 11a is integrally formed with the valve body 11 at a connecting portion on the out-port 20 side of the first safety valve 10A, and at a connecting portion of the in-port 19 side of the second safety valve 10B. In addition, a connecting surface 80 that contacts the contact surface 52 of the plate-shaped member 51, and a coupling projection 82 having a tapered back surface 82a are provided in the coupling frame 11a. At an outer end surface on the in-port 19 side of the first safety valve 10A and an outer end surface on the out-port 20 side of the second safety valve 10B, such a coupling frame 11a is provided as needed.

Incidentally, in the second embodiment, since there is no need to fix the coupling frame 11a to the valve body 11 with a bolt, the bolt hole 73 is not opened in the coupling frame as in the first embodiment. Although it is similar to each embodiment described below, the coupling frame can integrally or separately be formed with the valve body in any of the embodiments.

Other constructions and operations in the second embodiment are substantially similar to that of the first embodiment. Hence, the same numerals as that of the first embodiment are attached to the main components of the second embodiment in FIG. 7, and the explanation thereof is omitted.

Figure 9:
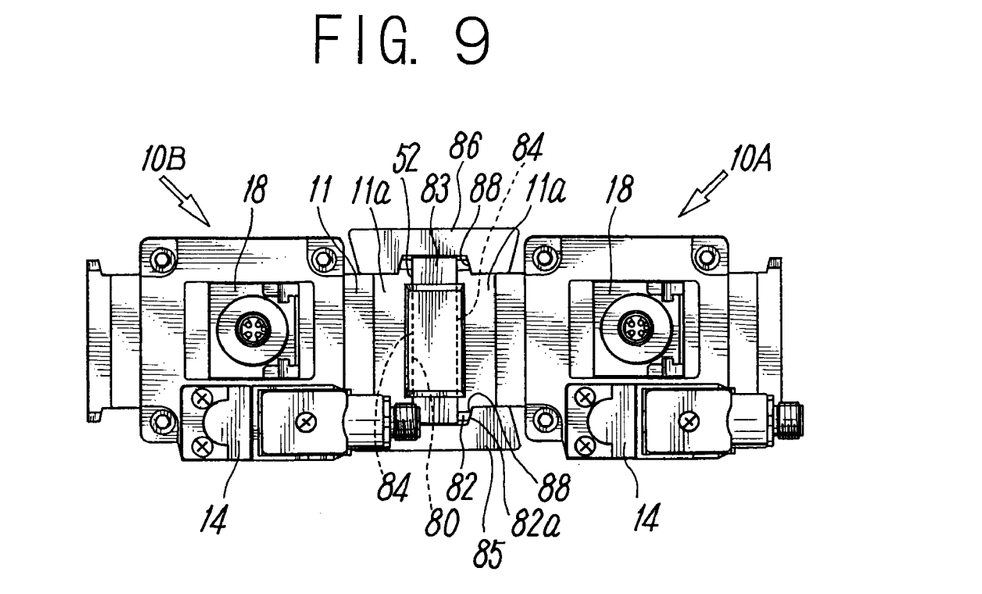
FIG. 9 is a top view illustrating a third embodiment of the combined safety valve according to the present invention.
Figure 10:
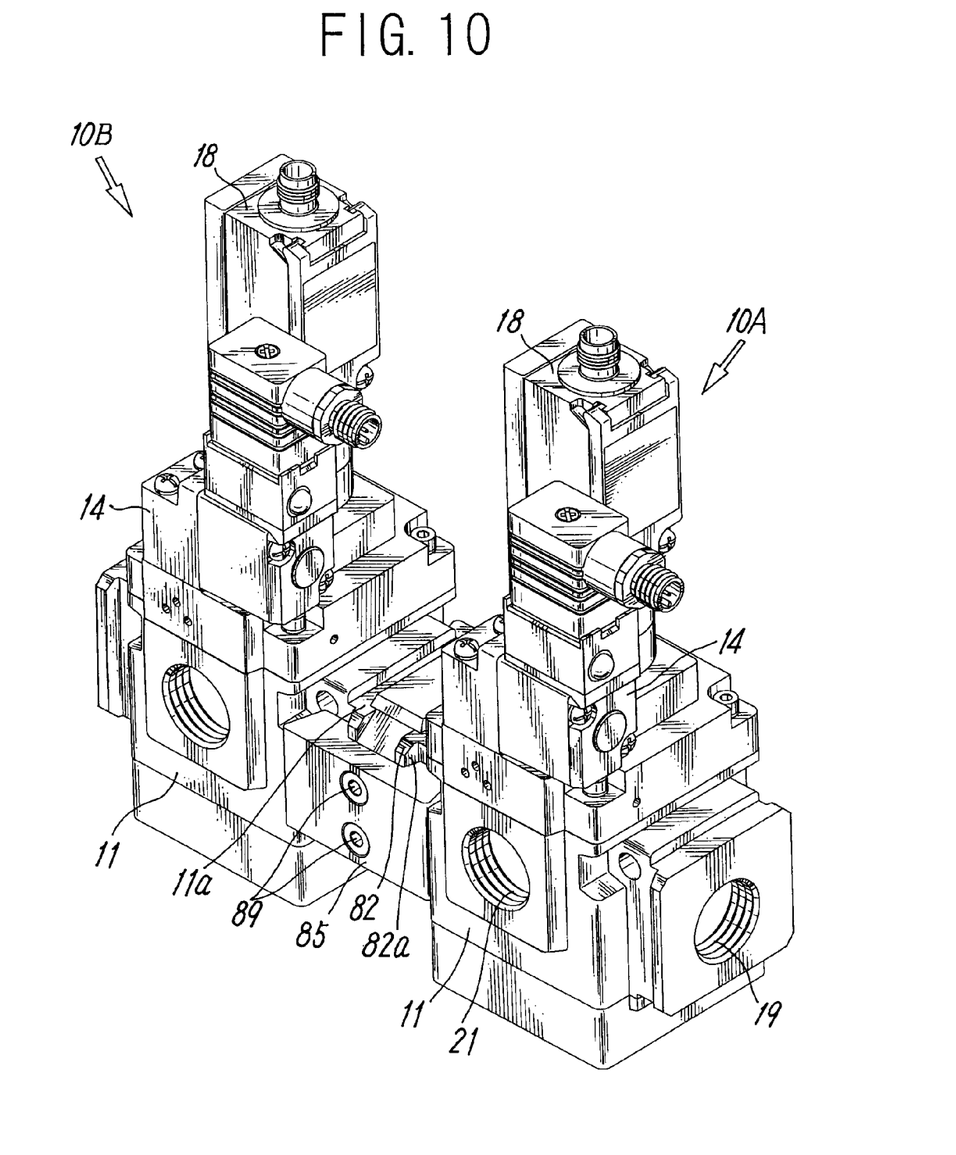
FIG. 10 is a perspective view of a makeup of the third embodiment of the combined safety valve according to the present invention.

Next, referring to FIG. 9 and FIG. 10, a third embodiment of the present invention is explained. In the third embodiment, similar to the second embodiment, the coupling projection 82 having the tapered back surface 82a and the connecting surface 80 being brought into contact with a contacting surface 84 of a plate-shaped member 83 are provided in the coupling frame 11a that is integrally formed with the valve body 11. Further, the plate-shaped member 83 serving as one of members constituting the connecting implement 50 is blocked by forming a board thickness thereof to be greater than that of the plate-shaped member 51 in the first embodiment, and further, a pair of latch members 85 and 86 for sandwiching the coupling projection 82 together with the plate-shaped member 83, and tightening the same from both sides thereof are fixed on both side end portions of the plate-shaped member 83 with two of upper and lower attaching bolts 89, respectively. Hence, bolt holes (not illustrated) are formed at upper and lower portions of both side end surfaces of the plate-shaped member 83.

Incidentally, it is natural to say that a continuous hole for allowing the out-port 20 of the first safety valve 10A and the in-port 19 of the second safety valve 10B to communicate with each other is provided in the plate-shaped member 83.

A vertically long concave portion extending from an upper end to a lower end is formed in an inside surface of the pair of latch members 85 and 86 (a surface on the plate-shaped member 83 side), and a pair of slanting engaging portion 88 expanding from a bottom surface of the concave portion in a tapered manner is formed at both side ends of the concave portion. The slant of the engaging portion 88 is formed along the tapered back surface 82a of the coupling projection 82.

Incidentally, other constructions and operations in the third embodiment are not substantially different from that of the first or second embodiment. Hence, the same numerals as that of the first or second embodiment are attached to the main components in the drawings and the explanation thereof is omitted.

Figure 11A:
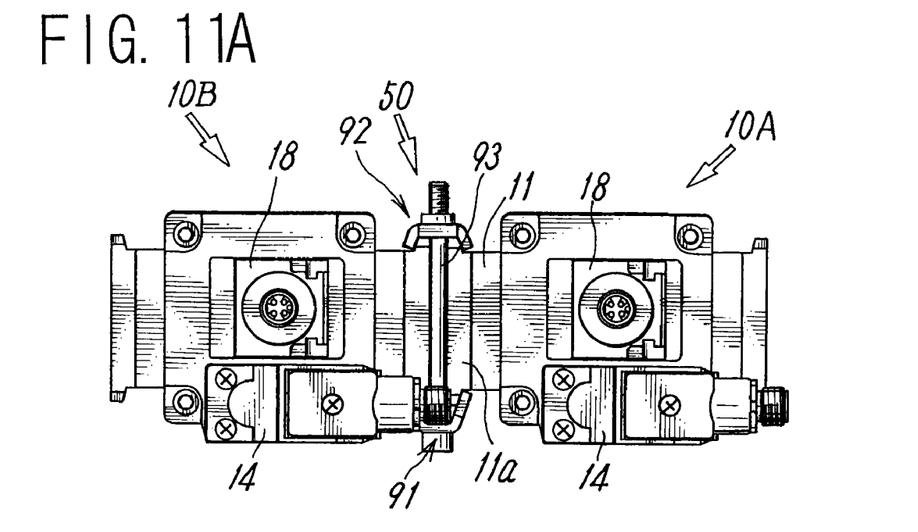
FIG. 11A is a top view illustrating the fourth embodiment of the combined safety valve according to the present invention.
Figure 11B:
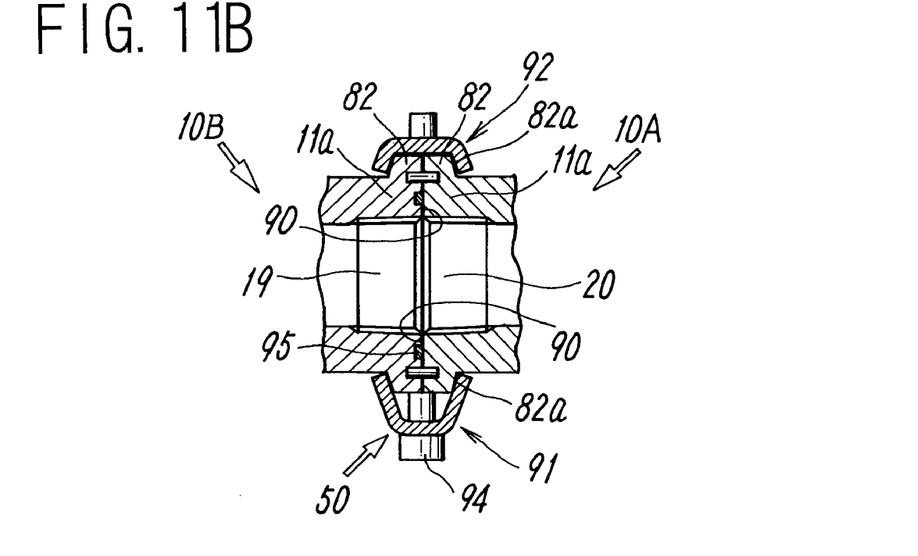
FIG. 11B is a cross-sectional view illustrating a main part of the fourth embodiment of the combined safety valve according to the present invention.
Figure 12:
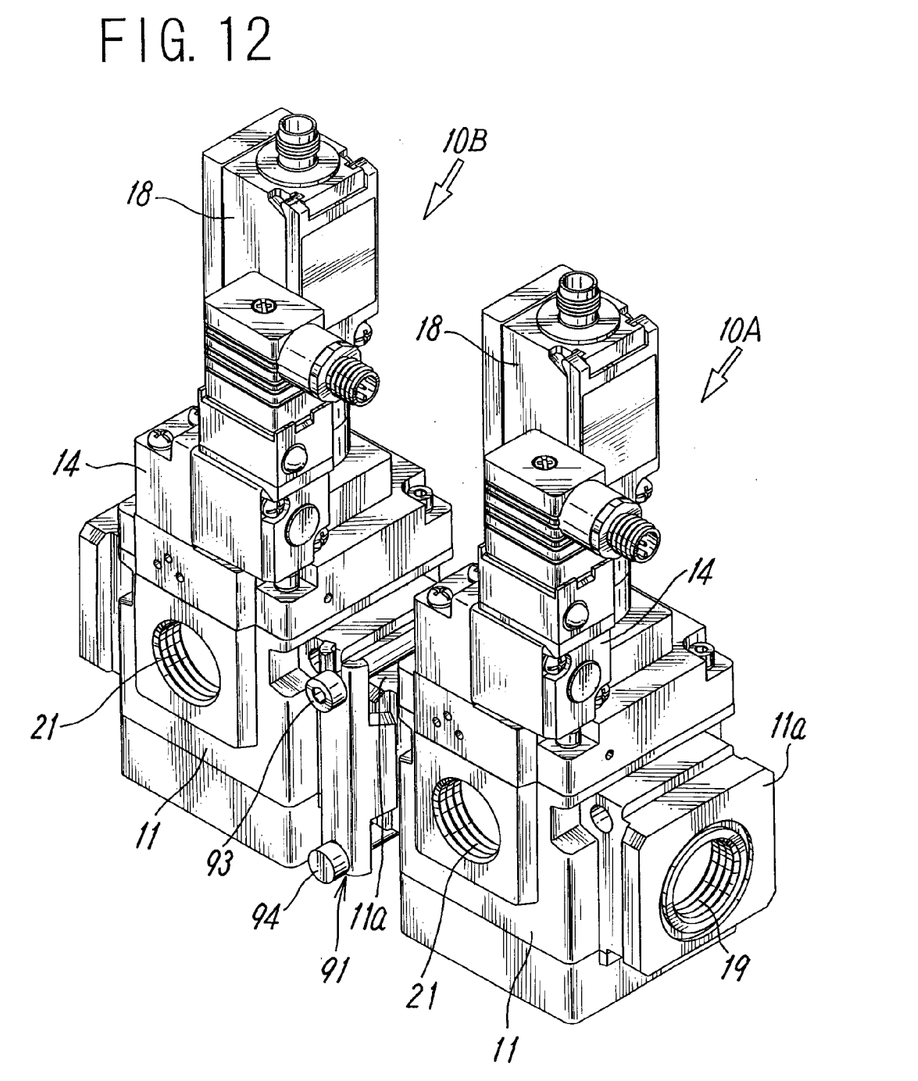
FIG. 12 is a perspective view of a makeup of the fourth embodiment of the combined safety valve according to the present invention.

FIG. 11A, FIG. 11B, and FIG. 12 illustrate a fourth embodiment of the combined safety valve according to the present invention. In the combined safety valve, similar to the second embodiment, the coupling frame 11a is integrally formed with the valve body 11, and a connecting surface 90 is provided in the coupling frame 11a. Further, the coupling projection 82 having the tapered back surface 82a at a position of both side end portions of the connecting surface 90 is integrally provided. In the fourth embodiment, the connecting surface 90 on the out-port 20 side of the first safety valve 10A and the connecting surface 90 on the in-port 19 side of the second safety valve 10B are directly brought into contact with each other via a seal member 95, and both the coupling frames 11a and 11a are separatably coupled by means of latch members 91 and 92 of the connecting implement 50.

Although the latch members 91 and 92 are not functionally different from the latch members 57 and 58 in the first and second embodiments, the latch members 91 and 92 are different from the latch members 57 and 58 at a point that the coupling projection 82 is tightened and fixed without using the plate-shaped member 51 by directly contacting both the connecting surfaces 90 and 90. In addition, both the latch members 91 and 92 are similarly coupled using a rod member 93 formed of a fixing bolt, and a rod member 94 formed of a coupling rod, similar to that in the first and second embodiment.

The invention claimed is:

1. A combined safety valve comprising:
a first safety valve formed of a pilot-type three-port valve; and
a second safety valve formed of a pilot-type three-port valve, the first and second safety valves being separatably coupled via a connecting implement in a condition of communicating an out-port of the first safety valve and an in-port of the second safety valve,
wherein a first connecting portion on an out-port side of the first safety valve includes a first coupling frame fixed to a first valve body, the first coupling frame being a separate component from the first valve body, a first connecting surface being located on the first coupling frame where the out-port is opened, and first coupling projections being located on both side end portions of the first connecting surface, respectively,
wherein a second connecting portion on an in-port side of the second safety valve includes a second coupling frame fixed to a second valve body, the second coupling frame being a separate component from the second valve body, a second connecting surface being located on the second coupling frame where the in-port is opened, and second coupling projections being located at a position corresponding to the first coupling projections of the first safety valve, on both side end portions of the second connecting surface, respectively,
wherein the connecting implement includes
a plate-shaped member intervening between the first coupling frame and the second coupling frame, and
a coupling member for coupling the first coupling frame and the second coupling frame,
wherein the plate-shaped member includes
a continuous hole for communication between the out-port and the in-port, and
contacting surfaces where the first connecting surface on the out-port side and the second connecting surface on the in-port side are adjoined, and
wherein the coupling member fixes the first and second coupling projections of the first coupling frame and the second coupling frame, which face each other, by tightening in a mutually approaching direction.

2. The combined safety valve according to claim 1, wherein a back surface of each of the first and second coupling projections facing an opposite side of the first and second connecting surfaces, respectively, is formed of a tapered surface slanting in a direction gradually approaching the first and second connecting surfaces, respectively, from an inside to an outside of the first coupling frame and the second coupling frame,
wherein the coupling member includes
two latch members positioned at both sides of the connecting portion, and
a rod member that tightens the latch members in a direction that draws the latch members toward each other, and
wherein the latch members a pair of latch portions that sandwich the first and second coupling projections from both sides by slanting in a direction along the tapered surface of the first and second coupling projections facing each other.

3. The combined safety valve according to claim 2, wherein the plate-shaped member includes an upper frame portion and a lower frame portion, and the rod member is passed through a penetration hole and a passing through groove formed in the upper frame portion and the lower frame portion, and both ends of the rod member are latched with the latch members.

4. The combined safety valve according to claim 2, wherein the rod member is a bolt, and both the latch members are fixed to the plate-shaped member with the bolt.

5. The combined safety valve according to claim 1, wherein a pilot valve for driving a main valve of each of the first safety valve and the second safety valve, and a position detecting device for detecting a position of the main valve are disposed on each of the first and second valve bodies of the first safety valve and second safety valve.

* * * * *